United States Patent [19]

Ault

[11] 4,276,245

[45] Jun. 30, 1981

[54] METHOD OF MAKING AND USING MOLDS FOR LONGITUDINALLY CURVED SECTIONS OF PIPE INSULATION

[75] Inventor: Russell L. Ault, Newark, Ohio

[73] Assignee: Owens-Corning Fiberglas Corporation, Toledo, Ohio

[21] Appl. No.: 68,808

[22] Filed: Aug. 22, 1979

[51] Int. Cl.³ .............................................. B29D 27/04
[52] U.S. Cl. .................................... 264/46.5; 249/91; 249/160; 264/46.9; 264/225
[58] Field of Search ...................... 264/46.7, 225, 46.4, 264/46.9, 221, 220, 46.5, 219, 46.6; 249/91, 160

[56] References Cited

U.S. PATENT DOCUMENTS

| | | | |
|---|---|---|---|
| 2,724,868 | 11/1955 | Kish | 264/46.6 |
| 2,755,510 | 7/1956 | Rauter | 264/221 X |
| 3,072,971 | 1/1963 | Kish | 264/219 X |
| 3,141,053 | 7/1964 | Terry | 264/220 |
| 3,247,549 | 4/1966 | Kolt | 264/219 X |
| 3,248,758 | 5/1966 | Schmitz et al. | 264/219 X |
| 3,723,585 | 3/1973 | Nussbaum | 264/46.7 X |
| 4,073,049 | 2/1978 | Lint | 264/219 X |

FOREIGN PATENT DOCUMENTS

| | | | |
|---|---|---|---|
| 1266549 | 6/1961 | France | 264/219 |
| 52-12264 | 1/1977 | Japan | 264/255 |
| 1159329 | 7/1969 | United Kingdom | 264/46.9 |
| 1247903 | 9/1971 | United Kingdom | 264/225 |

Primary Examiner—Philip Anderson
Attorney, Agent, or Firm—Ronald C. Hudgens; Philip R. Cloutier; Paul J. Rose

[57] ABSTRACT

A first mold is made by mounting a plurality of semicircular ribs of a relatively large radius on a board in spaced relationship and centered along an arc on the board with the ribs extending generally radially of the arc and having diametral portions of their peripheries facing the board, foaming a foamable hardenable liquid resin in place between each pair of adjacent ribs, and applying hardenable liquid resin over the ribs and foam. A glass fiber reinforced outer jacket for insulation is formed on and removed from the first mold. A second mold is made similarly to the first but using semicircular ribs of a relatively small radius. The outer jacket is mounted on the second mold and the space therebetween has foamable hardenable liquid resin inserted therein to form a jacketed longitudinally curved semicircular section of foamed resin pipe insulation.

1 Claim, 6 Drawing Figures

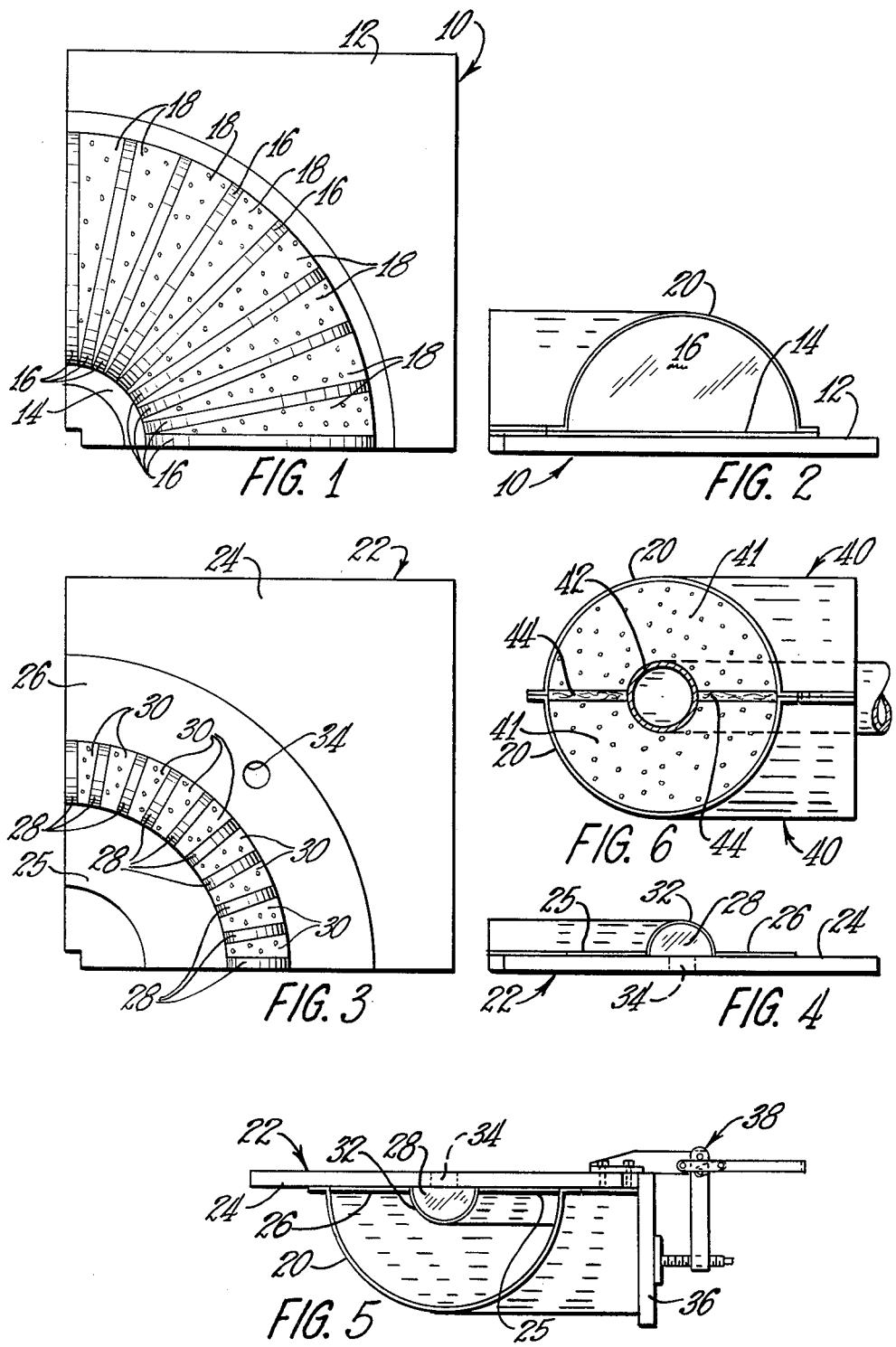

METHOD OF MAKING AND USING MOLDS FOR LONGITUDINALLY CURVED SECTIONS OF PIPE INSULATION

TECHNICAL FIELD

This invention relates to foamed plastic pipe insulation, and more particularly to a method of making molds for curved sections of such pipe insulation.

BACKGROUND ART

Formerly curved sections of foamed plastic pipe insulation were cut from large blocks when the number of pieces to be produced did not justify the cost of making a mold. This resulted in a considerable amount of waste material.

DISCLOSURE OF INVENTION

In accordance with the invention, an inexpensive method of making molds for curved sections of foamed plastic pipe insulation is provided.

BRIEF DESCRIPTION OF DRAWINGS

FIG. 1 is a plan view of a first mold constructed in accordance with the invention;

FIG. 2 is an elevational view of the mold of FIG. 1 and an outer casing for a curved section of pipe insulation molded thereon;

FIG. 3 is a plan view of a partially completed second mold constructed in accordance with the invention;

FIG. 4 is an elevational view of the mold of FIG. 3, but in a completed state;

FIG. 5 is an elevational view of the mold of FIG. 4 in use with an outer casing produced on and removed from the mold of FIG. 1, for producing a curved section of foamed plastic pipe insulation; and FIG. 6 is a view of a ninety degree pipe elbow from one end, the elbow having insulation thereon produced from the molds of the invention.

BEST MODE OF CARRYING OUT THE INVENTION

With respect to the drawings, FIGS. 1 and 2 show a first mold 10 constructed in accordance with the invention and including a board 12 formed of suitable material and preferably having an arcuate metal plate 14 secured thereto. A plurality of spaced semicircular ribs 16, nine in the embodiment shown, cut from a board such as particle board, are secured to the plate 14 and the board 12 by suitable means, such as by screws (not shown). The ribs 16 extend generally radially of the arcuate plate 14. An excess of a foamable hardenable liquid mixture, such as polyisocyanate, polyol, a blowing agent, and a catalyst, is placed between the ribs 16 and allowed to foam and cure to form rigid polyurethane foam segments 18. Excess foam material is then removed to render the foam segments 18 flush with the ribs 16. Resin-impregnated glass fiber mat (not shown) is then placed over the ribs 16 and segments 18 and covered with a gel coat to provide a finished mold surface.

A flanged outer jacket 20 for a section of pipe insulation is formed by laying-up resin impregnated glass fiber mat on the mold 10. After curing of the resin, the jacket 20 is removed from the mold 10.

FIGS. 3 and 4 show a second mold 22 constructed in accordance with the invention and including a board 24 formed of suitable material and having a pair of concentric, spaced, arcuate metal plates 25 and 26 secured thereto by any suitable means. A plurality of spaced semicircular ribs 28, ten in the embodiment shown, cut from a board such as particle board, are secured to the board 24 between the plates 25 and 26 by suitable means, such as by screws (not shown). The ribs 28 extend generally radially of the arcuate plates 25 and 26. As for the foam segments 18 of the mold 10, a plurality of foam segments 30 are foamed in place between the ribs 28. A surface layer 32 is then formed over the ribs 28 and foam segments 30 by laying resin-impregnated glass strand mat thereover, covering it with a gel coat, and curing to provide a finished molding surface. The surface layer 32 remains as part of the mold 22. A hole 34 is provided through the board 24 and plate 26.

FIG. 5 shows the mold 22 of FIGS. 3 and 4 associated with an outer jacket 20 removed from the mold 10 of FIGS. 1 and 2. The plates 25 and 26 serve as a guide in the mounting of the jacket 20 on the board 24. An end board 36 is clamped to one end of the curved section mold formed by the mold 22 and the jacket 20 by a conventional clamp 38 secured to the board 24. It will be understood that another end board like end board 36 is clamped to the other end of the curved section mold. Foamable hardenable liquid material is introduced through the hole 34 to form a curved section 40 of foamed plastic pipe insulation 41 having an outer jacket 20. Two such curved sections 40 are shown in FIG. 6 mounted on a ninety degree pipe elbow 42. The clearance space occupied by the plates 25 and 26 during forming of a curved section 40 is filled with fibrous insulation 44 in the completed installation.

I claim:

1. A method of making a longitudinally curved section of foamed resin pipe insulation having a glass fiber reinforced resin outer jacket, the method comprising making a first mold by mounting a plurality of flat, semicircular ribs of a relatively large radius in an arcuate pattern and in arcuately aligned, spaced relationship on a first board with each rib having a diametral portion of its periphery facing the board and extending generally radially of the arcuate pattern, and foaming a foamable, hardenable liquid resin in place between each pair of adjacent ribs to provide foam segments between the ribs, making a second mold by mounting a plurality of flat, semicircular ribs of a relatively small radius in arcuate pattern and in arcuately aligned, spaced relationship on a second board with each rib having a diametral portion of its periphery facing the board and extending generally radially of the arcuate pattern, and foaming a foamable, hardenable liquid resin in place between each pair of adjacent ribs to provide foam segments between the ribs, forming a glass fiber reinforced resin outer jacket on the first mold, removing the outer jacket from the first mold, placing the outer jacket in juxtaposition with the second mold, foaming a foamable, hardenable liquid resin in place between the outer jacket and the second mold to produce a longitudinally curved section of foamed resin pipe insulation having the glass fiber reinforced resin outer jacket adhered thereto, and removing the pipe insulation with the outer jacket from the second mold.

* * * * *